US010296484B2

(12) United States Patent
Garibay et al.

(10) Patent No.: US 10,296,484 B2
(45) Date of Patent: *May 21, 2019

(54) DYNAMIC RE-ALLOCATION OF COMPUTER BUS LANES

(71) Applicant: International Business Machines Corporation, Armonk, NY (US)

(72) Inventors: Victor A. Garibay, Leander, TX (US); Daniel E. Hurlimann, Austin, TX (US); Chetan Mehta, Austin, TX (US); Fernando Pizzano, Poughkeepsie, NY (US); Thomas R. Sand, Rochester, MN (US)

(73) Assignee: International Business Machines Corporation, Armonk, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,373

(22) Filed: Dec. 1, 2015

(65) Prior Publication Data

US 2017/0154008 A1 Jun. 1, 2017

(51) Int. Cl.
*G06F 13/40* (2006.01)
*G06F 13/42* (2006.01)
*G06F 13/16* (2006.01)

(52) U.S. Cl.
CPC ...... *G06F 13/4282* (2013.01); *G06F 13/1678* (2013.01); *G06F 13/4022* (2013.01)

(58) Field of Classification Search
CPC .................................................. G06F 13/4081
USPC ......................................................... 710/307
See application file for complete search history.

(56) References Cited

U.S. PATENT DOCUMENTS

| 6,658,018 | B1 | 12/2003 | Tran et al. |
| 6,760,859 | B1 | 7/2004 | Kim et al. |
| 7,237,139 | B2 | 6/2007 | Hamilton, II et al. |
| 7,293,125 | B2 | 11/2007 | McAfee et al. |
| 7,447,824 | B2 * | 11/2008 | Jabori .......... G06F 1/3253 710/301 |
| 7,447,825 | B2 | 11/2008 | Chen |
| 7,480,757 | B2 | 1/2009 | Atherton et al. |
| 7,539,809 | B2 | 5/2009 | Juenger |

(Continued)

FOREIGN PATENT DOCUMENTS

| WO | 2008128990 | 10/2008 |
| WO | 2009027189 | 3/2009 |

OTHER PUBLICATIONS

Anonymous, Programmable PCI-Express Root Port Bifurcation, IP.com No. 000236239 IP.com Electronic Publication, Apr. 14, 2014.

*Primary Examiner* — Chun Kuan Lee (74) *Attorney, Agent, or Firm* — Lieberman & Brandsdorfer, LLC (57) ABSTRACT

The embodiments relate to dynamically re-allocating lanes of a computer bus. A computer system having a processor in communication with a module is booted. Allocation of lanes among adapters in communication with connectors of the computer bus is controlled at boot-time and, in response to detection of an additional adapter received after boot-time, an additional allocation of lanes to the additional adapter is dynamically controlled. The additional allocation includes allocating unallocated lanes to the additional adapter, and re-allocating at least one lane from the initial allocation in response to the unallocated lanes being insufficient.

20 Claims, 3 Drawing Sheets

(56) References Cited

U.S. PATENT DOCUMENTS

| | | |
|---|---|---|
| 7,600,112 B2 | 10/2009 | Khatri et al. |
| 7,657,688 B2 | 2/2010 | Atherton et al. |
| 7,660,925 B2 | 2/2010 | Larson et al. |
| 7,668,923 B2 | 2/2010 | Herring et al. |
| 7,711,886 B2 * | 5/2010 | Foster, Sr. ............ G06F 13/409 710/307 |
| 7,721,150 B2 | 5/2010 | Belyakov et al. |
| 7,793,030 B2 | 9/2010 | Jenkins et al. |
| 7,996,591 B2 | 8/2011 | Xie et al. |
| 8,195,589 B2 | 6/2012 | Bakke et al. |
| 9,043,526 B2 | 5/2015 | Freking et al. |
| 2006/0168377 A1 * | 7/2006 | Vasudevan .......... G06F 13/4081 710/104 |
| 2006/0179195 A1 * | 8/2006 | Sharma ................ G06F 9/5077 710/123 |
| 2007/0233930 A1 | 10/2007 | Gallagher et al. |
| 2011/0302357 A1 | 12/2011 | Sullivan |
| 2012/0144230 A1 | 6/2012 | Buckland et al. |
| 2014/0223064 A1 | 8/2014 | Wang |
| 2015/0026677 A1 | 1/2015 | Stevens et al. |

* cited by examiner

| | At Power up Time | After Hot Plug/Addition of Adapter₃ |
|---|---|---|
| Connector₀ (x16) | Adapter₀ at x16 | Adapter₀ at x16 |
| Connector₁ (x16) | Adapter₁ at x16 | Adapter₁ at x8 |
| Connector₂ (x16) | Adapter₂ at x8 | Adapter₂ at x8 |
| Connector₃ (x16) | Empty | Adapter₃ at x8 |

FIG. 4

DYNAMIC RE-ALLOCATION OF COMPUTER BUS LANES

BACKGROUND

The embodiments described herein relate generally to re-allocation of lanes to a computer bus. More specifically, the embodiments described herein relate to dynamic re-allocation of lanes among adapters received by connectors.

In computer architecture, a bus is a communication system that transfers data between components of a computer system. A local input/output (I/O) bus transfers data between a peripheral component and a computing device. Various types of I/O buses include, but are not limited to, Peripheral Components Interconnect (PCI), Accelerated Graphics Port (AGP), Industry Standard Architecture (ISA), Universal Serial Bus (USB), Micro Channel Architecture (MCA), Enhanced ISA (EISA), Video Electronics Standards Association (VESA), etc.

A PCI Express (PCI-e) bus is an implementation of a PCI computer bus according to a set of PCI Express specifications promulgated by the PCI Special Interest Group. The PCI-e bus uses conventional PCI programming and software concepts, but is based on serial bus architecture as opposed to the parallel bus architecture of the conventional PCI. This physical-layer of the PCI-e computer bus consists of a network of serial interconnections extending from a PCI host bridge or a switch to each peripheral component, referred to herein as an adapter. A connection between the host bridge or the switch to an adapter is referred to as a "link." The link consists of a collection of one or more lanes used for data communications. Each lane is a set of two unidirectional low voltage differential signaling pairs of transmission pathways such as, for example, traces along a motherboard. Since transmitting data and receiving data are implemented using separate differential pairs, each lane allows for full-duplex serial data communication.

Adapters minimally support single-lane links, and may optionally support wider links composed of two (×2), four (×4), eight (×8), twelve (×12), sixteen (×16), or thirty-two lanes (×32) by providing additional pins on the hardware interface of the adapter that plugs into a PCI-e connector, hereinafter referred to as a connector. The connector may physically support connections for one (×1), two (×2), four (×4), eight (×8), twelve (×12), sixteen (×16), or thirty-two (×32) lanes. Each adapter may be received by any connector that physically supports the same or a greater number of lanes as the lanes physically supported by the adapter. For example an adapter (×8) may be installed into any connector (×8)-(×32). Although the connector and its installed adapter may physically support links with up to thirty-two lanes, an adapter may utilize fewer lanes for data communication than the maximum number of lanes physically supported by the adapter and the connector. For example, for an adapter (×8) installed in a connector (×16), the adapter (×8) may utilize one, two, or four of those eight lanes for data communications. The number of lanes actually utilized for the data communications link between the PCI host bridge or switch and an adapter is typically the highest number of lanes mutually supported by the host bridge, the adapter and its corresponding connector.

SUMMARY

The aspects described herein include a system, a method, and a computer program product for dynamically re-allocating lanes among connectors of a computer bus.

According to one aspect, a system is provided to support dynamic allocation of lanes of a bus interface. The system includes a processor in communication with memory and a module. A plurality of connectors is in communication with the module, with each connector configured to receive a respective adapter. The module detects presence of an adapter received after boot-time. More specifically, the module dynamically controls a re-allocation of the lanes to the additional adapter. The re-allocation includes the module to allocate unallocated lanes to the additional adapter, and re-allocate at least one lane from the initial allocation in response to the unallocated lanes being insufficient.

According to another aspect, a method is provided for dynamically re-allocating lanes of a bus interface. At boot-time an initial allocation of lanes to each connector having a detected adapter takes place. In response to detection of an additional adapter placed in communication with the module after boot-time, an additional allocation of the lanes to the additional adapter is dynamically controlled by the module. The additional allocation includes allocating unallocated lanes to the additional adapter, and re-allocating at least one lane from the initial allocation in response to the unallocated lanes being insufficient.

According to yet another aspect, a computer program product is provided to dynamically allocate lanes of a bus interface. The computer program product includes a computer-readable storage medium having program code embodied therewith. The program code is executable by a processing unit to detect a presence of a plurality of adapters in communication with a module at boot-time, and perform an initial allocation of lanes to each connector having a detected adapter. In response to detection of an additional adapter placed in communication with the module after boot-time, program code is provided to dynamically control an additional allocation of the lanes to the additional adapter. The additional allocation includes program code to allocate unallocated lanes to the additional adapter, and re-allocate at least one lane from the initial allocation in response to the unallocated lanes being insufficient.

Other features and advantages of this invention will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not all embodiments, unless otherwise explicitly indicated.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the method, computer program product, and system, as presented in the Figures, is not intended to be limited, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments described herein will be best understood by reference to the drawings, wherein like parts are designated by like numerals throughout. The following description is intended only by way of example, and simply illustrates certain selected embodiments of devices, systems, and processes that are consistent with the claims herein.

Allocation of lanes to connectors having installed, or received, adapters may be fixed at boot-time, or power-up time. That is, whichever configuration is picked at the system start, e.g. boot, will be the configuration that the computer system will have during operation. Other approaches for lane allocation include detecting the presence of each received adapter at boot-time, and allocating lanes based on the detection. It is understood that minimal to be allocated to a connector that does not have an installed adapter. Such connectors are referred to herein as empty connectors.

A component (e.g., a peripheral hardware device) may be cold-pluggable or hot-pluggable. A cold-pluggable component requires a computer system to be powered down in order to add or remove the component, or in order to synchronize component data with the computer system. In contrast to a cold-pluggable component, a hot-pluggable component (also known as a hot-swappable component) does not require the computer system to be powered down in order to add or remove the component, or in order to synchronize data with the computer system. More specifically, hot-swapping is performed when it is either desirable or necessary to alter or modify the computer system without interruption. The PCI-e bus architecture, for example, supports hot-pluggable, or hot-swappable components. Details of lane allocation and specifically re-allocation, is described herein with respect to components installed following a system boot.

Figure 1:
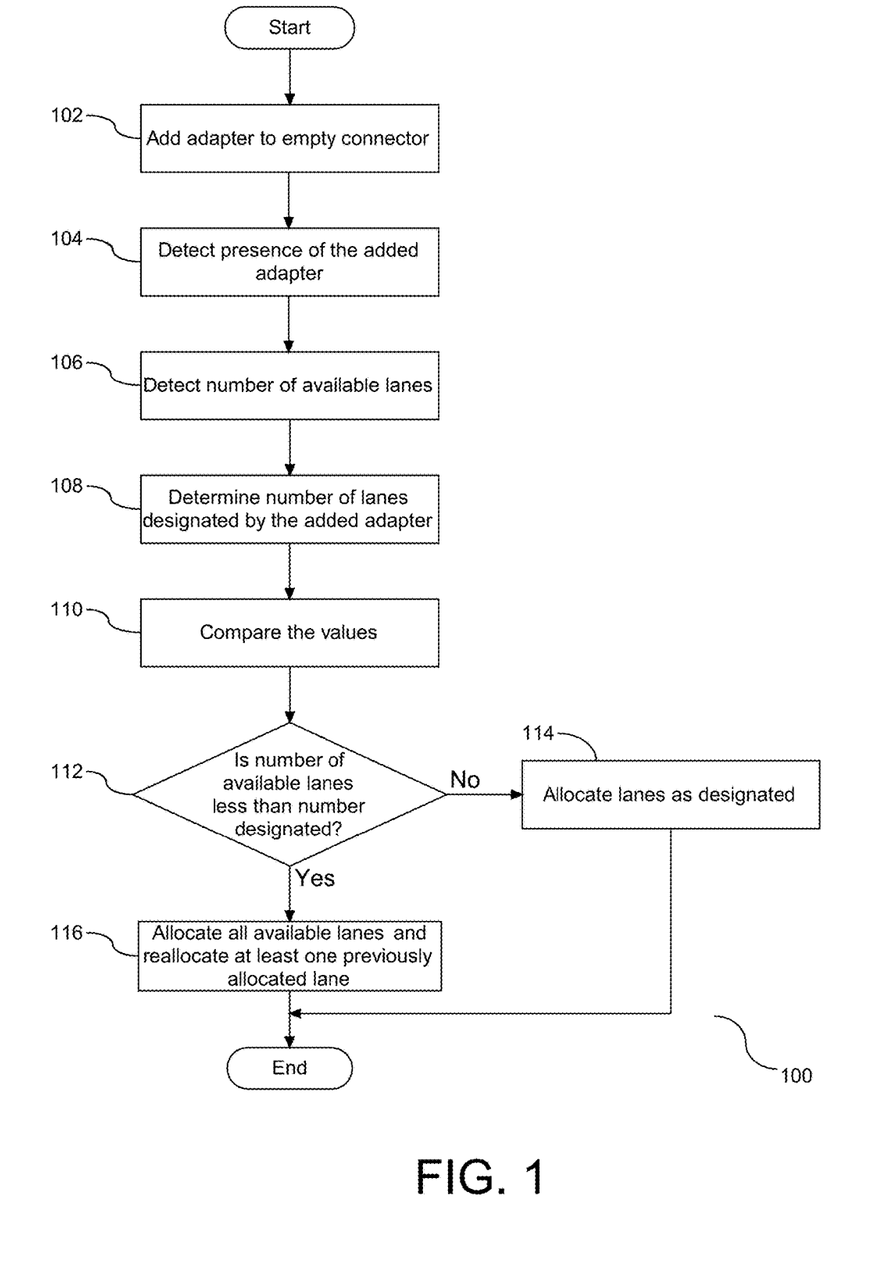
FIG. 1 depicts a flow chart illustrating a process for allocating lanes of a bus interface after boot-time, according to an embodiment.

Referring to FIG. 1, a flow chart (100) is provided illustrating a process for allocating lanes of a computer bus after boot-time. An adapter is added to an empty connector (102) at some time after boot-time, and presence of this additional adapter is detected (104). In response to the detection at step (104), a quantity of available lanes is determined (106), and a total number of lanes designated by the additional adapter are determined (108). In one embodiment, the quantity of available lanes is equal to the number of lanes not previously allocated at boot-time. Following the determinations, these values are compared (110).

The comparison ascertains if the number of available lanes is less than the number of lanes designated by the additional adapter (112). A negative response to the determination at step (112) indicates that there are enough unallocated lanes to accommodate the additional adapter, and that the additional adapter is assigned its designated number of lanes exclusively from the collection of unallocated lanes (114). An affirmative response to the determination at step (112) indicates that there are not enough previously unallocated lanes to accommodate the additional adapter, and at least one of the previously allocated lanes is re-allocated (116).

The number of lanes that are re-allocated at step (116) is the difference between the total number of lanes required for the additional adapter to operate at least at a minimum functional level, and the quantity of available lanes. In one embodiment, the re-allocation at step (116) includes downshifting at least one connector, while simultaneously maintaining at least a minimum functional level of the adapter received by the downshifted connector. Downshifting is performed by modifying the lane width associated with the at least one connector. For example, a connector (×16) may be downshifted to a connector (×4). In one embodiment, a connector is downshifted by downshifting a host bridge associated with the connector. Downshifting is known in the art, and a further description of downshifting will not be provided herein. In one embodiment, the re-allocation at step (116) includes a multiplexer or other switch ("MUX/switch") removing lanes from the at least one downshifted connector, and re-allocating these lanes to the additional adapter. In one embodiment, the presence detection mechanism, as previously discussed in the context of FIG. 1, is implemented to perform steps (104)-(112), and the MUX/switch is configured to allocate the lanes at steps (114) and (116). Accordingly, an allocation of lanes is controlled after boot-time in response to detecting the presence of an additional adapter, which may include a re-allocation of lanes if there are not enough unallocated lanes available for allocation.

Figure 2:
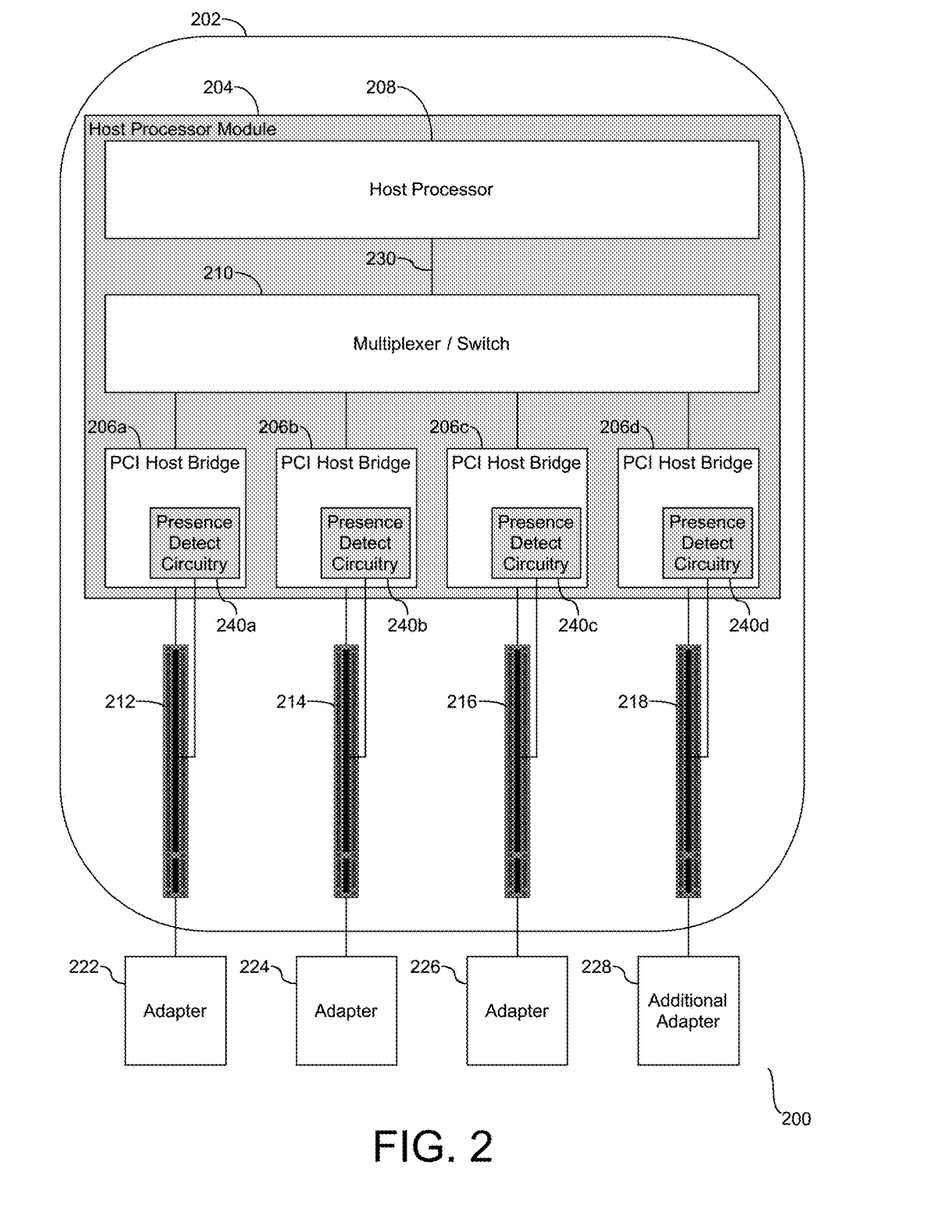
FIG. 2 depicts a block diagram illustrating a bus interface system, according to an embodiment.

The method shown and described in FIG. 1 represents a process for dynamically controlling a re-allocation of lanes among adapters received by connectors of a computer bus. With reference to FIG. 2, a block diagram (200) is provided illustrating an example of a computer bus interface system (202) to support dynamic allocation of lanes of a computer bus. The system (202) is operational with numerous other general purpose or special purpose computing system environments or configurations. Examples of well-known computing systems, environments, and/or configurations that may be suitable for use with the system (202) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As shown in FIG. 2, the system (202) includes a host processor module (204). The module (204) is further shown having four host bridges (206a), (206b), (206c), and (206d). In alternative embodiments, the quantity of host bridges may be different depending on the computer bus interface system being utilized and, as such, it is to be understood and appreciated that the embodiments described herein are not limited to the four host bridges (206a)-(206d).

The module (204) further includes a host processor (208) in communication with a multiplexer or other switch ("MUX/switch") (210). The MUX/switch (210) is also in communication with each of the host bridges (206a)-(206d). The MUX/switch (210) provides communication between the host processor (208) and each host bridge (206a)-(206d). A plurality of connectors (212)-(218) of the system (202) is shown. Although only four connectors are shown, this quantity is not considered limiting. Each connector (212), (214), (216), and (218) is shown in communication with the module (204) via host bridges (206a), (206b), (206c), and (206d), respectively. In alternative embodiments, the quantity of connectors may be different depending on the computer bus interface system being utilized and, as such, it is to be understood and appreciated that the embodiments described herein are not limited to the four connectors (212)-(218) as shown. As shown, each connector is in communication with a respective host bridge, with a direct correspondence between each host bridge and each associated connector.

It is to be understood that the modular arrangement of the components described herein above is provided as an illustrative example, and it is to be appreciated that the components may be arranged in any configuration in accordance with the embodiments described herein. In other words, the term "module" as used herein should not be interpreted to be limiting with respect to the particular arrangement described above, but should be broadly construed to include any combination of the components. For example, the components may be arranged in a single hardware device, as a combination of multiple hardware devices, or in any combination thereof in accordance with the embodiments described herein.

Each connector (212)-(218) is configured to receive a respective maximum number of lanes for allocation, which may be referred to as a connector width. In one embodiment, each connector (212)-(218) may be a 16 lane PCI-e connector, which means that each connector (212)-(218) has a 16-lane width. Hence, a maximum of sixty-four lanes may (theoretically) be allocated among the connectors shown (i.e., 16×4=64). In the system (202), there are a finite number of total lanes (230) that may be allocated among the connectors (212)-(218). In the embodiment shown and described in FIG. 2, forty total lanes (230) are available for allocation. Accordingly, in this example, there are fewer lanes available for allocation than the maximum number of lanes that may be allocated to each connector, respectively.

Since each of the connectors (212)-(218) has a 16-lane width, any adapter received by the connectors (212)-(218) may not have a lane designation exceeding sixteen lanes, but may have a lane designation less than sixteen lanes. For example, in the embodiment shown and described in FIG. 2, between four and sixteen of the available lanes (230), inclusive, may be allocated among each connector (212)-(218), respectively. In one embodiment, each adapter has a different lane designation and, as such, it is to be understood and appreciated that the adapters may have varying lane designations.

Presence detect circuitry (240a), (240b), (240c), and (240d), hereinafter referred to as detectors (240a)-(240d), are shown embedded in host bridges (206a), (206b), (206c), and (206d), respectively, and in communication with the connectors (212), (214), (216), and (218), respectively. The detectors (240a)-(240d) are configured to detect the adapters present at boot-time, and any additional adapters that may be received after boot-time. Accordingly, the detectors support both static and dynamic detection of adapters.

At boot-time, as shown in this example, adapters (222), (224), and (226) are received by connectors (214), (216), and (218), respectively, and there is no adapter received by connector (218). In other words, connector (218) is empty at boot-time. Thus, detectors (240a)-(240c) will detect the presence of adapters (222)-(226) received by their respective connectors (212)-(216), while the detector (240d) will not detect the presence of any adapter received by its respective connector (218). In response to the detection of adapters (222)-(226) received by connectors (212)-(216), respectively, the MUX/switch (210) is configured to control the allocation of at least a portion of the available lanes (e.g., the forty total lanes) to the adapters (222)-(226) in accordance with the method described above with reference to FIG. 1.

After boot-time, an additional adapter (228) is shown received by connector (218). The detector (240d) in communication with connector (218) detects the presence of the received additional adapter (228). In response to this detection, the MUX/switch (210) controls an allocation of lanes to support the additional adapter (228). First, a portion of the lanes (230) that were unallocated at boot-time are assigned by the MUX/switch (210) to the additional adapter (228). If this unallocated portion of the lanes (230) is less than the quantity of lanes designated for the additional adapter (228), then one or more lanes that were previously allocated to the adapters (222)-(226) are re-allocated by the MUX/switch (210) to the additional adapter (228). That is, the number of re-allocated lanes is equal to the difference between the quantity of lanes designated for the additional adapter (228) and the previously unallocated portion of the lanes (230). The lanes may be re-allocated to the additional adapter (228) from a single one of the adapters present at boot-time (222)-(226), or from a combination of the adapters present at boot-time (222)-(226). In one embodiment, the re-allocation includes downshifting of one or more of the host bridges (206a)-(206c), and the MUX/switch (210) subsequently removing lanes associated with the downshifted one or more host bridges (206a)-(206c). The MUX/switch (210) then provides the host bridge (206d) with the removed lanes for allocation to the additional adapter (228). Accordingly, the MUX/switch (210) dynamically controls the allocation of the lanes to support an additional adapter received after boot-time, or hot-plugged, in accordance with the method described above with reference to FIG. 1.

Figure 3:
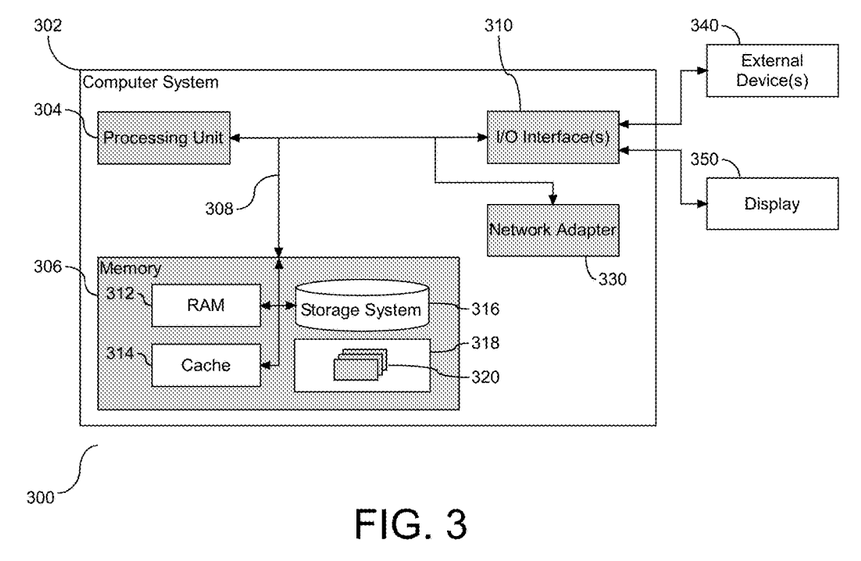
FIG. 3 depicts a block diagram illustrating a system implementing the bus interface system of FIG. 3, according to an embodiment.

Referring now to FIG. 3, a block diagram (300) is provided illustrating an example of a computer system (302) to implement the system of FIG. 2. Computer system/server (302) may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 3, computer system/server (302) is shown in the form of a general-purpose computing device. The components of computer system (302) may include, but are not limited to, one or more processors or processing units (304), a system memory (306), and a bus (308) that couples various system components including system memory (306) to processor (304). Bus (308) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system (302) typically includes a variety of computer system readable media. Such media may be any available media that is accessible by computer system (302), and it includes both volatile and non-volatile media, removable and non-removable media.

Memory (306) can include computer system readable media in the form of volatile memory, such as random access memory (RAM) (312) and/or cache memory (314).

The system (402) further includes other removable/non-removable, volatile/non-volatile computer system storage media. By way of example only, storage system (316) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (308) by one or more data media interfaces. As will be further depicted and described below, memory (306) may include at least one program product having a set (e.g., at least one) of program modules that are configured to carry out the functions of the embodiments described above with reference to FIGS. 1-2.

Program/utility (318), having a set (at least one) of program modules (320), may be stored in memory (306) by way of example, and not limitation, as well as an operating system, one or more application programs, other program modules, and program data. Each of the operating systems, one or more application programs, other program modules, and program data or some combination thereof, may include an implementation of a networking environment. Program modules (320) generally carry out the functions and/or methodologies of embodiments as described above with reference to FIGS. 1-2.

The computer system (302) may also communicate with one or more external devices (340), such as a keyboard, a pointing device, a display (350), etc. The external devices (340) may include hardware components that may linked to the processor (304) for transmission and receipt of data via connectors of the I/O interface (310). In one embodiment, I/O interface (310) is a PCI-e computer bus interface. The I/O interface (310) may include a module (not shown) for controlling lane allocation among adapters of the external devices (340) received by the I/O interface (310), as described above with reference to FIGS. 1-3.

The computer system may also communicate with one or more other devices that enable a user to interact with the computer system (302) and/or any devices (e.g., network card, modem, etc.) that enable the computer system (302) to communicate with one or more other computing devices. Still yet, the computer system (302) can communicate with one or more networks such as a local area network (LAN), a general wide area network (WAN), and/or a public network (e.g., the Internet) via network adapter (330). As depicted, network adapter (330) communicates with the other components of the computer system (302) via bus (308). It should be understood that although not shown, other hardware and/or software components could be used in conjunction with the computer system (302). Examples, include, but are not limited to: microcode, device drivers, redundant processing units, external disk drive arrays, RAID systems, tape drives, and data archival storage systems, etc.

Figure 4:
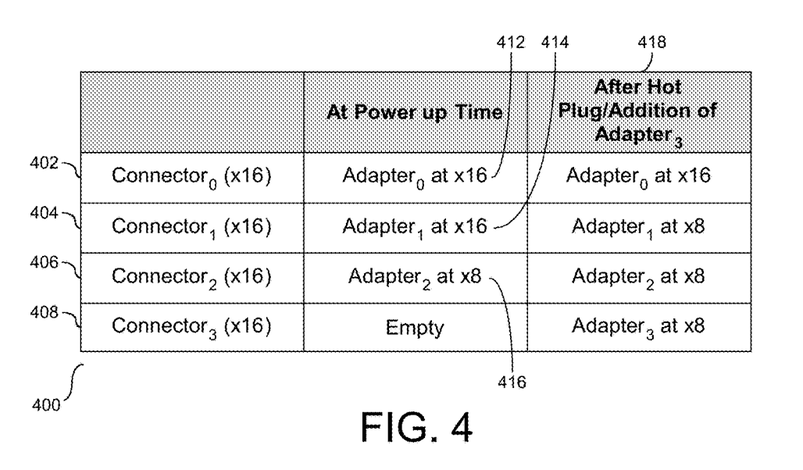
FIG. 4 depicts a chart illustrating the re-allocation of lanes after the addition of an adapter after boot-time, according to an embodiment.

Referring now to FIG. 4, a chart (400) is provided illustrating a re-allocation of lanes in accordance with an exemplary embodiment. As shown, there are four connectors, $Connector_0$ (402), $Connector_1$ (404), $Connector_2$ (406), and $Connector_3$ (408), each having a maximum width of 16 lanes. In this example, at power-up, also known as boot-up, $Adapter_0$ (412), $Adapter_1$ (414), and $Adapter_2$ (416) are detected to be installed in, or received by, Connectors (402)-(406), respectively. No adapter is detected to be installed in $Connector_3$ (408), which indicates that $Connector_3$ (408) is initially an empty connector. Sixteen lanes are allocated to each of $Adapter_0$ (412) and $Adapter_1$ (414), eight lanes are allocated to $Adapter_2$ (416), and zero lanes are allocated to $Connector_3$ (408) at boot-up. Accordingly, at boot-up, there are forty lanes allocated to Adapters (412)-(416), with a maximum total number of sixty-four lanes that may be supported, as designated by the Connectors (402)-(408).

In this example, a fourth adapter, $Adapter_3$ (418), is added after boot-time, i.e., hot-plugged, to $Connector_3$ (408). As shown in this non-limiting illustrative example, this results in the re-allocation of eight lanes from $Adapter_1$ (414). In alternative embodiments, eight lanes may be re-allocated from $Adapter_0$ (412) or $Adapter_2$ (416), or may be re-allocated from a combination of Adapters (412)-(416). Accordingly, previously allocated lanes are re-allocated to a previously empty connector in response to detecting the presence of an additional adapter after boot-time.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated. Accordingly, the implementation of lane allocation to adapters received by connectors of a computer bus shown and described herein provides for a initial allocation of lanes to adapters present at boot-up, and a dynamic allocation of lanes in response to detection of the presence of an additional adapter after boot-up.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

We claim:

1. A system comprising:
   a processor in communication with memory;
   a module, the module comprising a multiplexer in communication with the processor, and two or more host bridges in communication with the multiplexer;
   a plurality of connectors in communication with respective host bridges, including a first connector in communication with a first host bridge and a second connector in communication with a second host bridge, wherein each host bridge is positioned as an interface between its respective connector and the multiplexer, and wherein each connector is configured to receive a respective adapter; and
   the module to:
     detect an additional adapter received after boot-time, and dynamically control an additional lane allocation through the multiplexer, wherein the additional allocation comprises the module to:
       classify the additional adapter, including designate the additional adapter as excluded from an initial lane allocation at boot-time;
       allocate at least one unallocated lane to the additional adapter; and
       in response to the at least one unallocated lane being insufficient, re-allocate at least one lane from the initial lane allocation, wherein the re-allocation comprises the module to downshift at least one connector associated with the initial lane allocation.

2. The system of claim 1, wherein the module further comprises detector circuitry in communication with each connector, wherein the detector circuitry is configured to detect the presence of each adapter.

3. The system of claim 1, wherein the additional allocation further comprises the module to:
   determine and compare two quantities related to lanes designated by the additional adapter and unallocated lanes; and
   allocate a number of lanes to the additional adapter based on the comparison, including the module to perform an action selected from the group consisting of:
   allocate at least a portion of the unallocated lanes, re-allocate at least one lane from the initial allocation, and a combination thereof.

4. The system of claim 3, wherein the module re-allocates the at least one lane of the initial allocation to the additional adapter in response to a determination that there are fewer unallocated lanes than lanes designated by the additional adapter.

5. The system of claim 4, wherein the downshift comprises a modification of lane width associated with the at least one downshifted connector.

6. The system of claim 1, wherein the module is comprised in a PCI-Express (PCI-e) computer bus interface.

7. The system of claim 1, wherein the additional adapter is a hot-pluggable component, and further comprising the module to detect the additional adapter during a hot-swap, wherein the additional lane allocation is performed in response to the hot-swap.

8. The system of claim 1, further comprising an operating system in communication with the module, the operating system facilitating networked communication between the module, the host bridges, the connectors, and the adapter.

9. A method comprising:
   a module detecting an additional adapter placed in communication with a connector after boot-time, the module comprising a multiplexer in communication with a processor and two or more host bridges in communication with the multiplexer, the host bridges including a first host bridge and a second host bridge, wherein the first host bridge is in communication with a first connector and the second host bridge is in communication with a second connector, wherein each host bridge is positioned as an interface between its respective connector and the multiplexer, and wherein each connector is configured to receive a respective adapter; and
   the module dynamically controlling an additional lane allocation through the multiplexer, wherein the additional allocation comprises:
     classifying the additional adapter including designating the additional adapter as excluded from an initial lane allocation at boot-time;
     allocating at least one unallocated lane to the additional adapter; and
     in response to the at least one unallocated lane being insufficient, re-allocating at least one lane from the initial lane allocation, wherein the re-allocations comprises the module downshifting at least one connector associated with the initial lane allocation.

10. The method of claim 9, wherein controlling the additional allocation of lanes further comprises:
    determining and comparing two quantities related to lanes designated by the additional adapter and unallocated lanes; and
    allocating a number of lanes to the additional adapter based on the comparison, including performing an action selected from the group consisting of: allocating at least a portion of the unallocated lanes, re-allocating at least one lane from the initial allocation, and a combination thereof.

11. The method of claim 10, wherein the re-allocation of the at least one lane of the initial allocation to the additional adapter is performed in response to determining that there are fewer unallocated lanes than lanes designated by the additional adapter.

12. The method of claim 11, wherein the downshift comprises modifying lane width associated with the at least one downshifted connector.

13. The method of claim 9, wherein the module is comprised in a PCI-Express (PCI-e) computer bus interface.

14. The method of claim 9, wherein the additional adapter is a hot-pluggable component, and further comprising the module detecting the additional adapter during a hot-swap, wherein the additional lane allocation is performed in response to the hot-swap.

15. A computer program product comprising a computer readable storage medium having program code embodied therewith, the program code executable by a processor to:
  detect an additional adapter placed in communication with a connector after boot-time, wherein the detection is performed by a module comprising a multiplexer in communication with the processor and two or more host bridges in communication with the multiplexer, the host bridges including a first host bridge and a second host bridge, wherein the first host bridge is in communication with a first connector and the second host bridge is in communication with a second connector, wherein each host bridge is positioned as an interface between its respective connector and the multiplexer, and wherein each connector is configured to receive a respective adapter;
  classify the additional adapter including designate the additional adapter as excluded from an initial lane allocation at boot-time; and
  dynamically control an additional lane allocation, wherein the additional lane allocation is controlled by the multiplexer, and wherein the additional allocation comprises program code to:
    allocate at least one unallocated lane to the additional adapter; and
    in response to the at least one unallocated lane being insufficient, re-allocate at least one lane from the initial lane allocation, wherein the re-allocation comprises program code to downshift at least one connector associated with the initial lane allocation.

16. The computer program product of claim 15, wherein the control of the additional allocation of lanes further comprises program code to:
  determine and compare two quantities related to lanes designated by the additional adapter and unallocated lanes; and
  allocate a number of lanes to the additional adapter based on the comparison, including program code to perform an action selected from the group consisting of: allocate at least a portion of the unallocated lanes, re-allocate at least one lane from the initial allocation, and a combination thereof.

17. The computer program product of claim 16, wherein the re-allocation of the at least one lane of the initial allocation to the additional adapter is performed in response to a determination that there are fewer unallocated lanes than lanes designated by the additional adapter.

18. The computer program product of claim 17, wherein the downshift comprises program code to modify lane width associated with the at least one downshifted connector.

19. The computer program product of claim 17, wherein the module is comprised in a PCI-Express (PCI-e) computer bus interface.

20. The computer program product of claim 15, wherein the additional adapter is a hot-pluggable component, and further comprising program code to detect the additional adapter during a hot-swap, wherein the additional lane allocation is performed in response to the hot-swap.

* * * * *